July 2, 1957 F. C. HARRIS 2,797,825
APPARATUS FOR HANDLING ARTICLES
Filed March 16, 1953 13 Sheets-Sheet 2
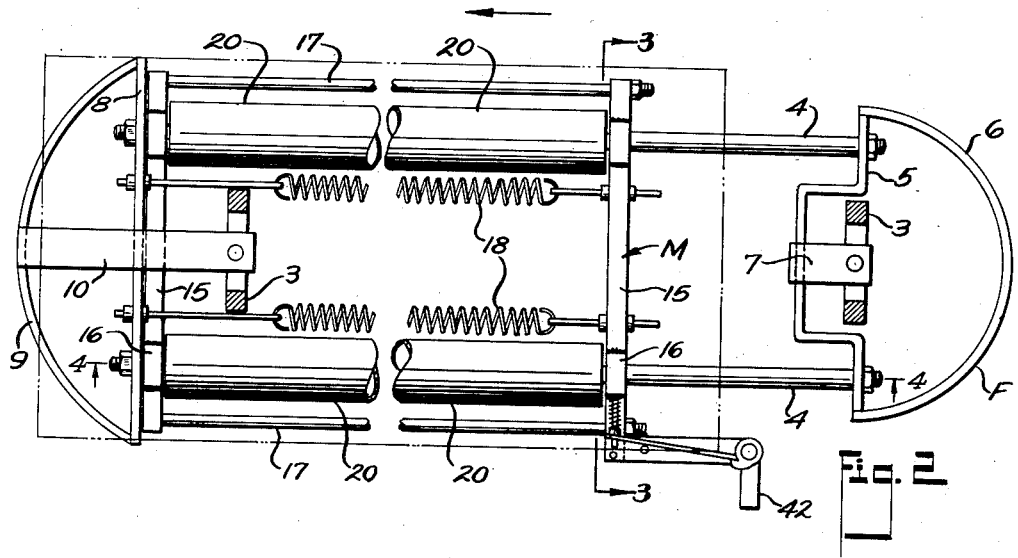
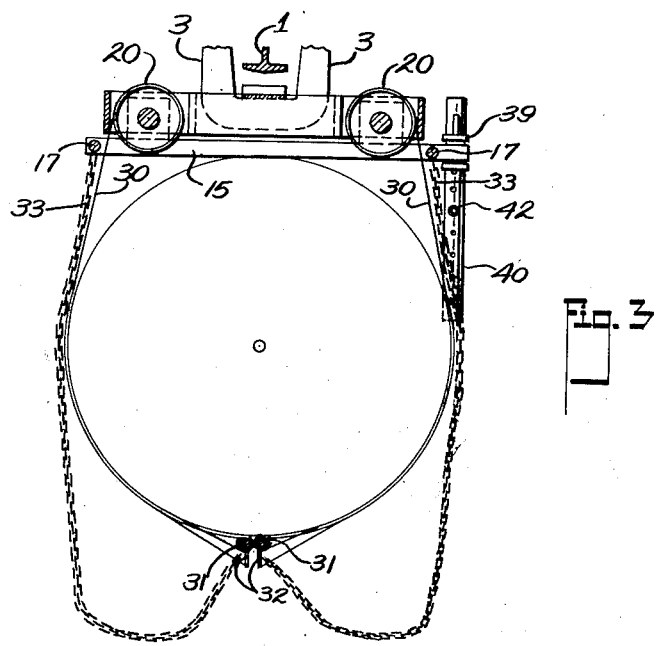
INVENTOR.
FRANK C. HARRIS
BY
RICHEY, WATTS, EDGERTON & McNENNY
A. D. Watts
ATTORNEYS

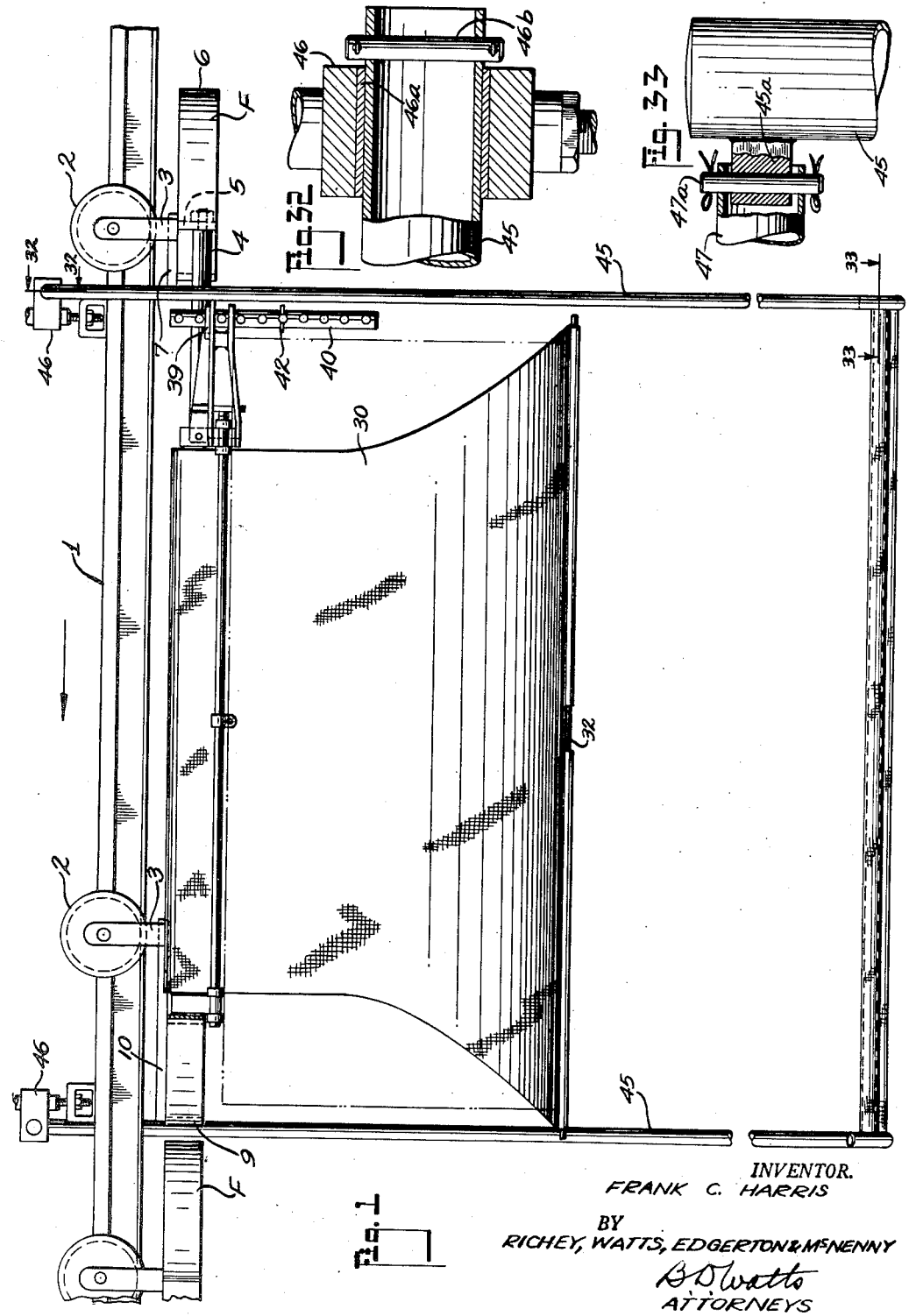

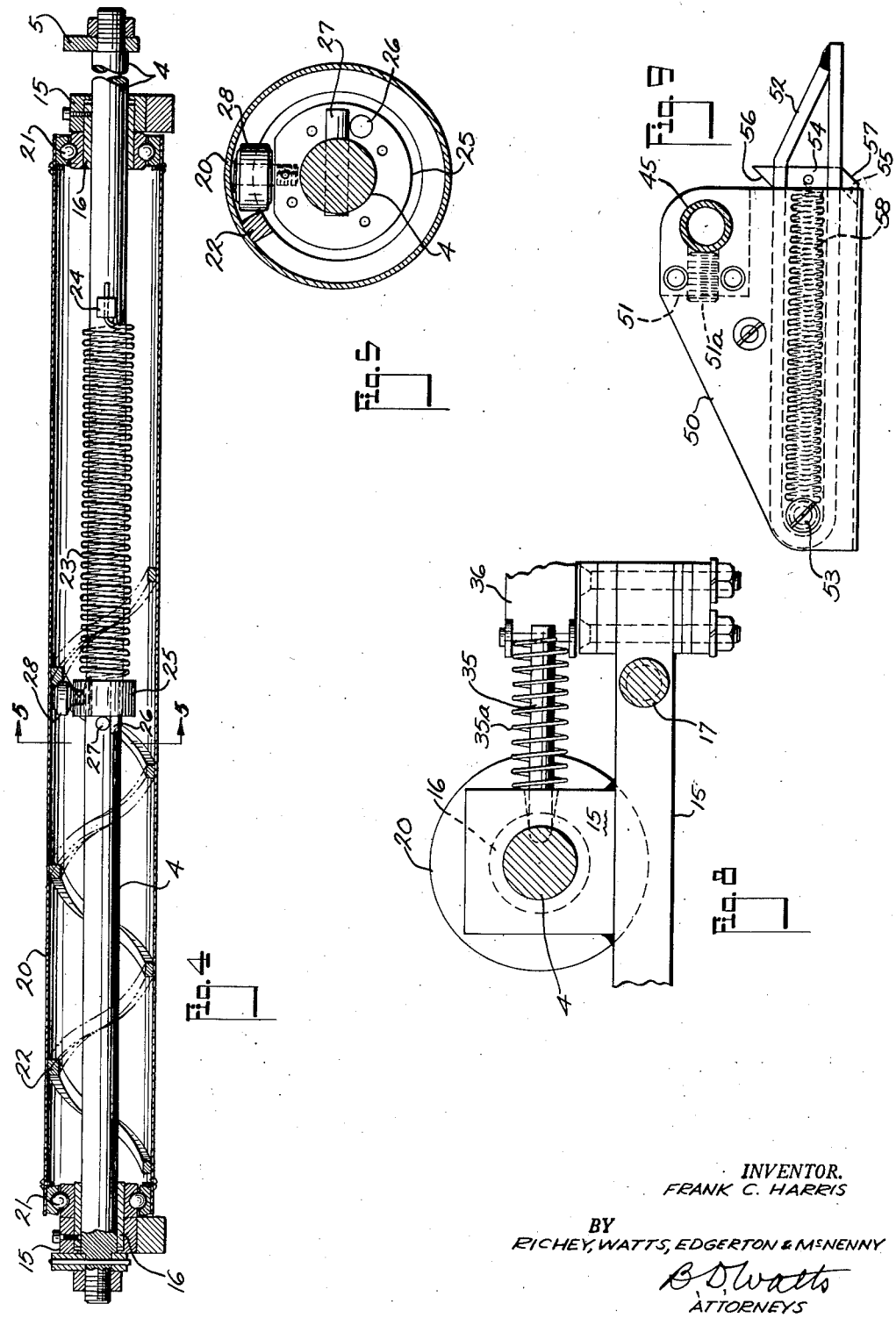

July 2, 1957
F. C. HARRIS
2,797,825
APPARATUS FOR HANDLING ARTICLES
Filed March 16, 1953
13 Sheets-Sheet 4
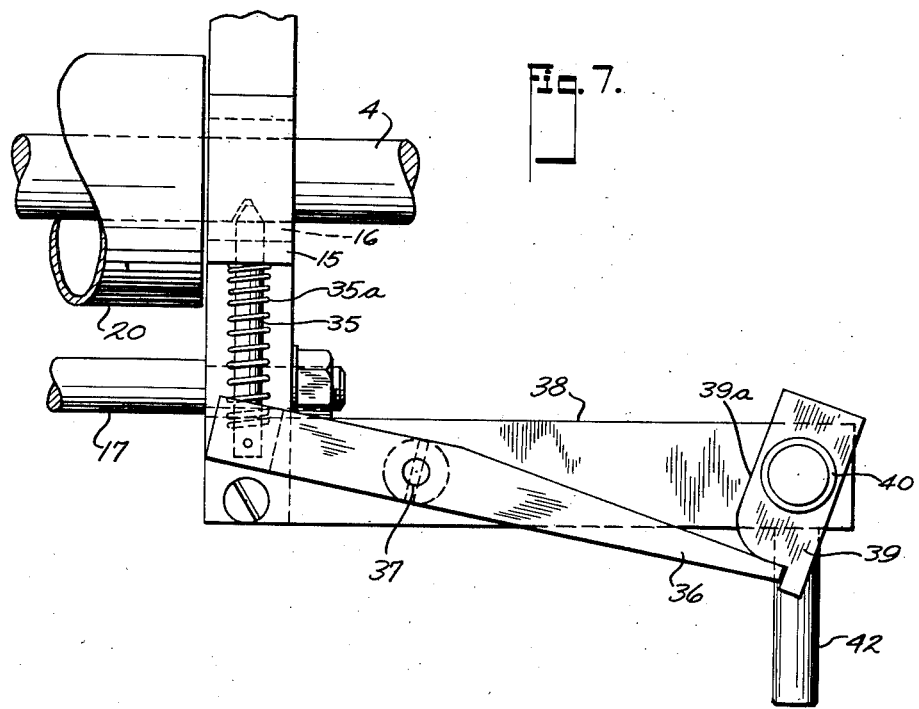
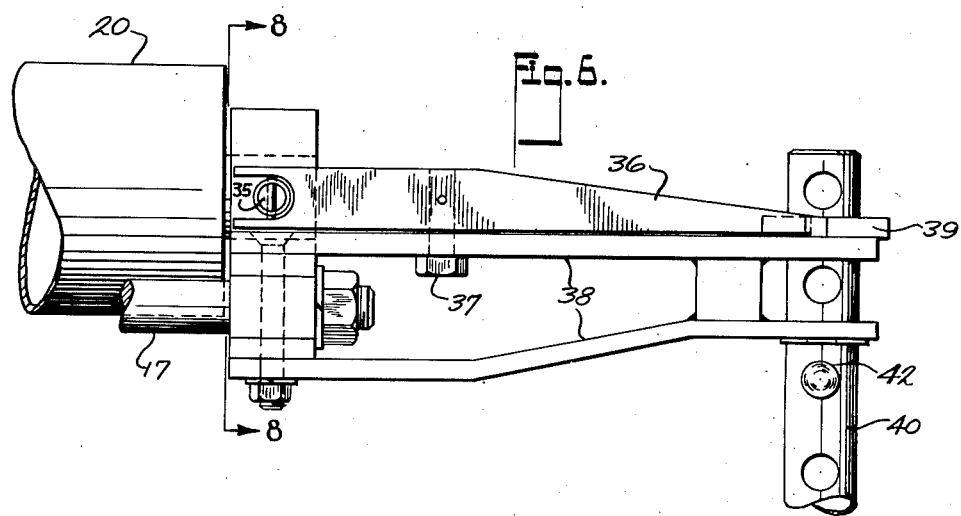
INVENTOR.
FRANK C. HARRIS
BY
RICHEY, WATTS, EDGERTON & McNENNY
ATTORNEYS

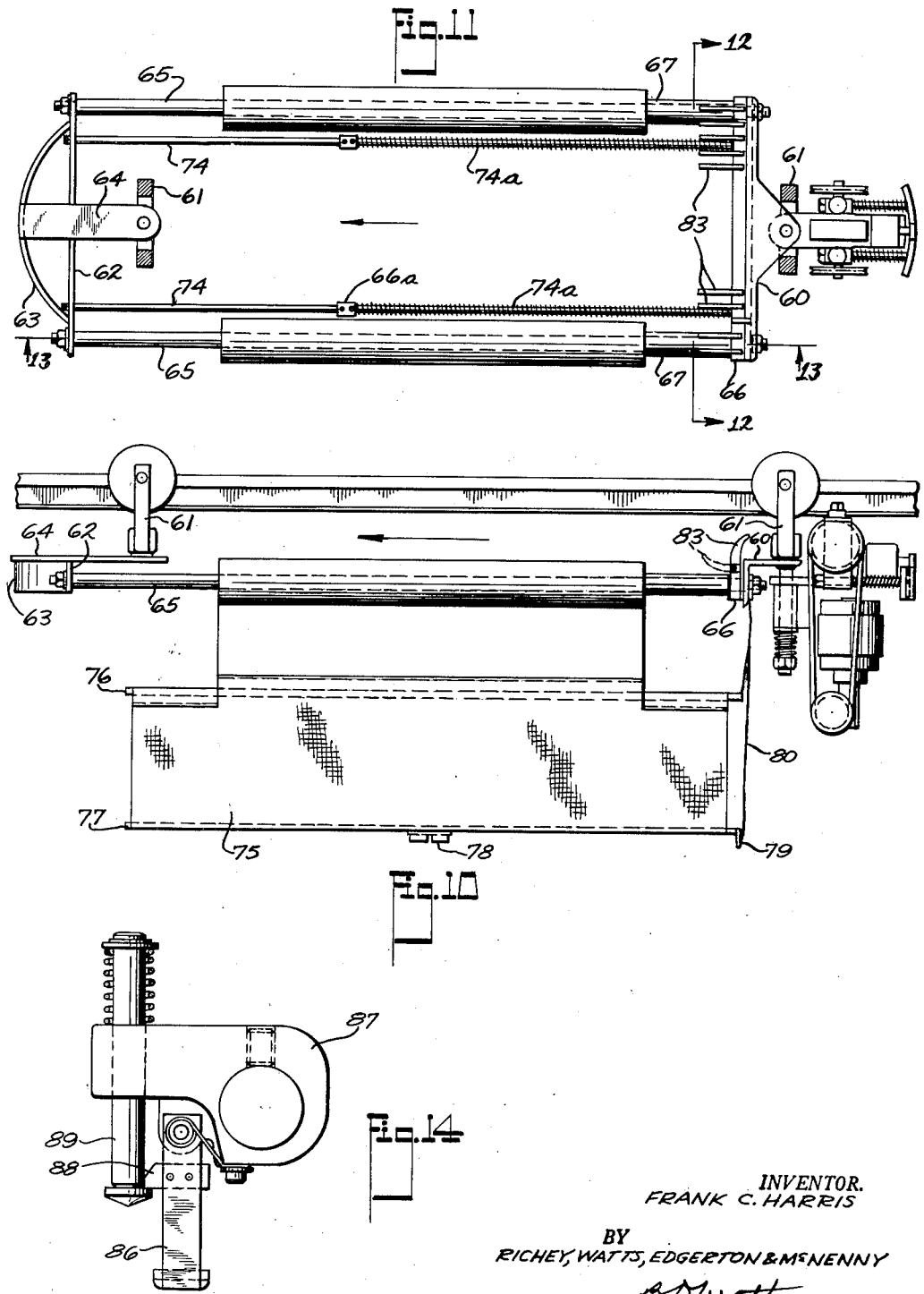

July 2, 1957　　　　F. C. HARRIS　　　　2,797,825
APPARATUS FOR HANDLING ARTICLES
Filed March 16, 1953　　　　13 Sheets-Sheet 6
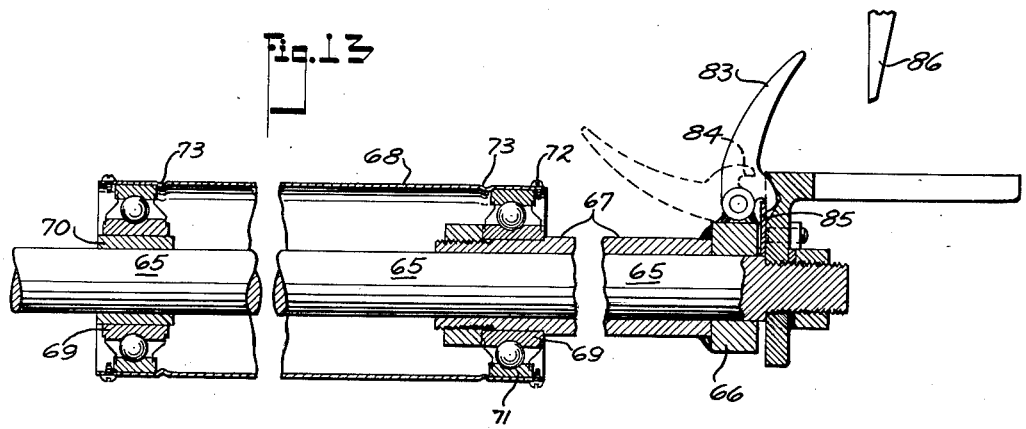
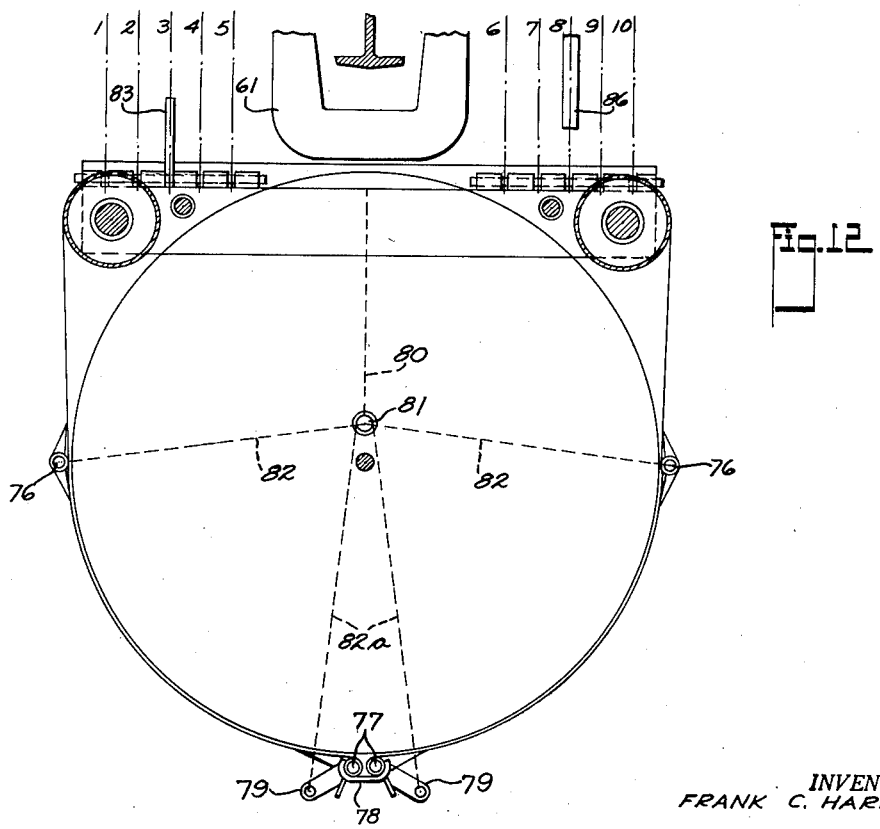
INVENTOR.
FRANK C. HARRIS
BY
RICHEY, WATTS, EDGERTON & McNENNY
ATTORNEYS July 2, 1957  F. C. HARRIS  2,797,825
APPARATUS FOR HANDLING ARTICLES
Filed March 16, 1953  13 Sheets-Sheet 7
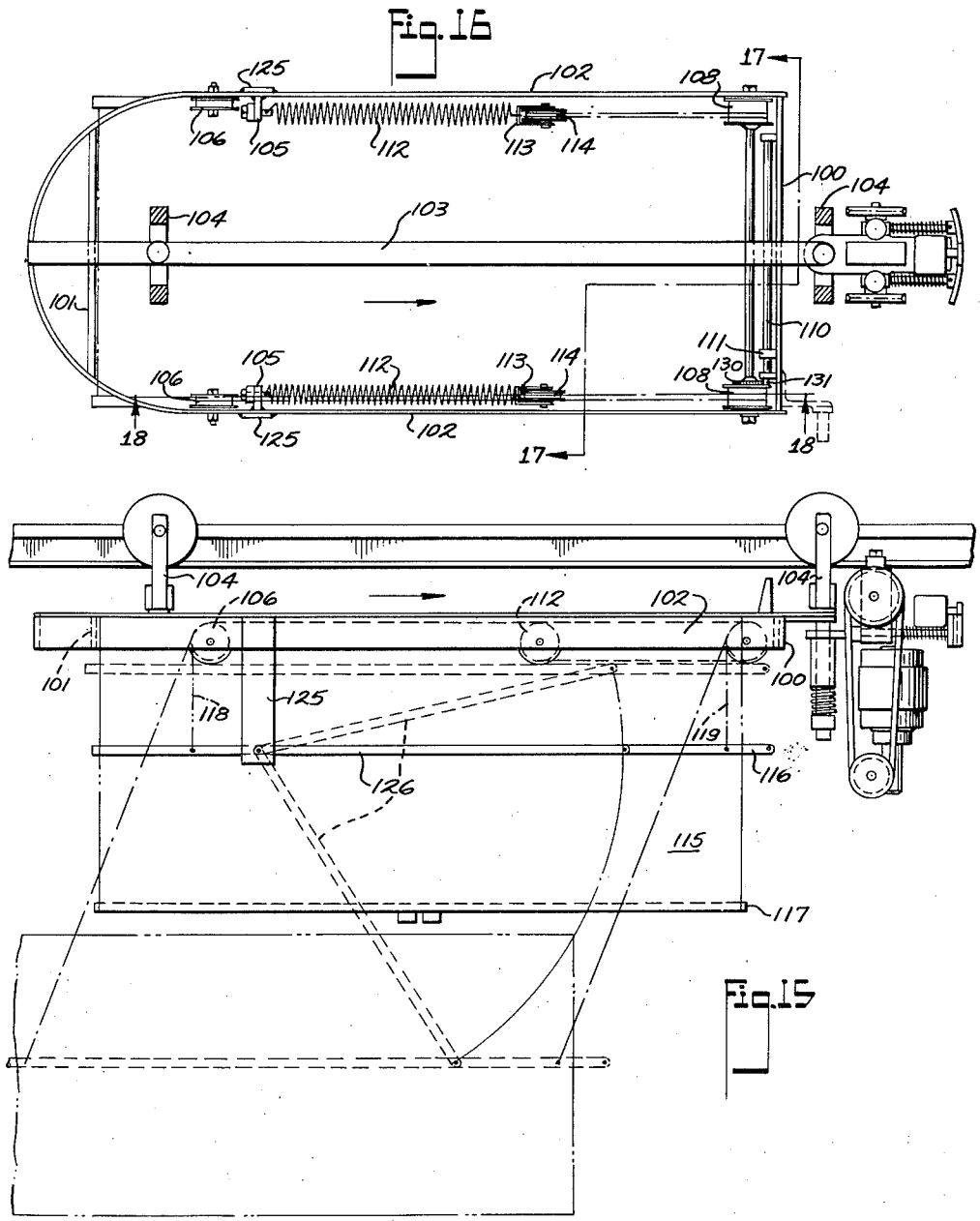
INVENTOR.
FRANK C. HARRIS
BY
RICHEY, WATTS, EDGERTON & McNENNY
ATTORNEYS July 2, 1957  F. C. HARRIS  2,797,825
APPARATUS FOR HANDLING ARTICLES
Filed March 16, 1953  13 Sheets-Sheet 8
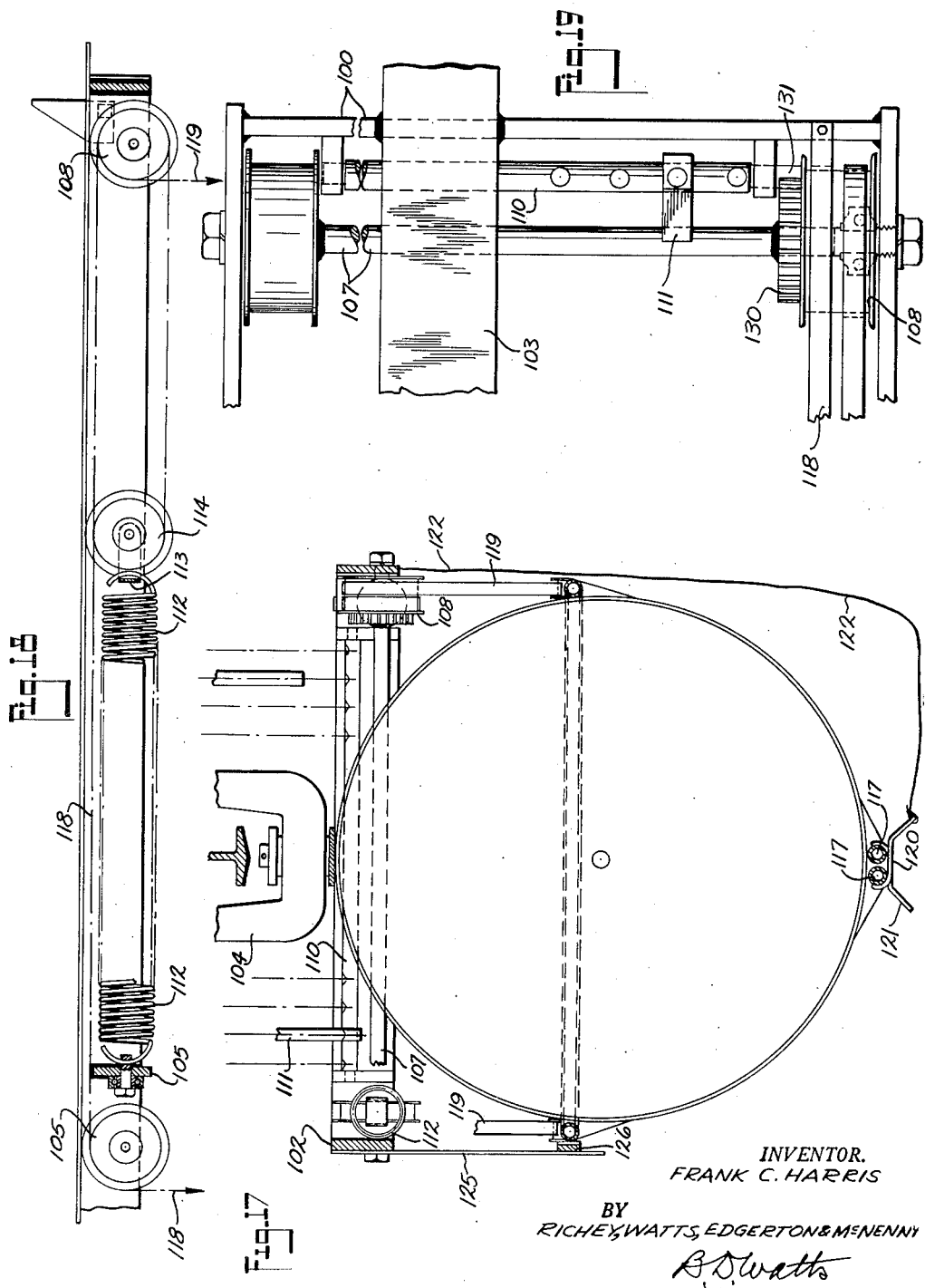
INVENTOR.
FRANK C. HARRIS
BY
RICHEY, WATTS, EDGERTON & McNENNY
ATTORNEYS

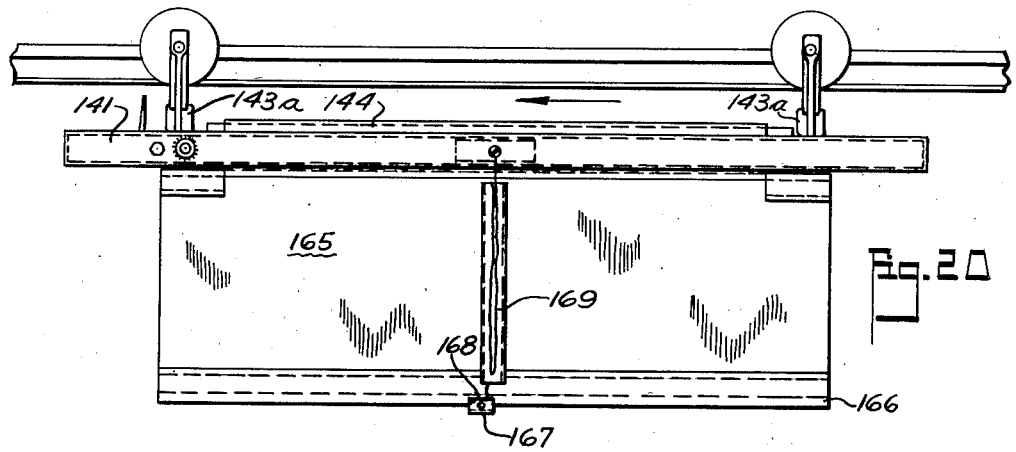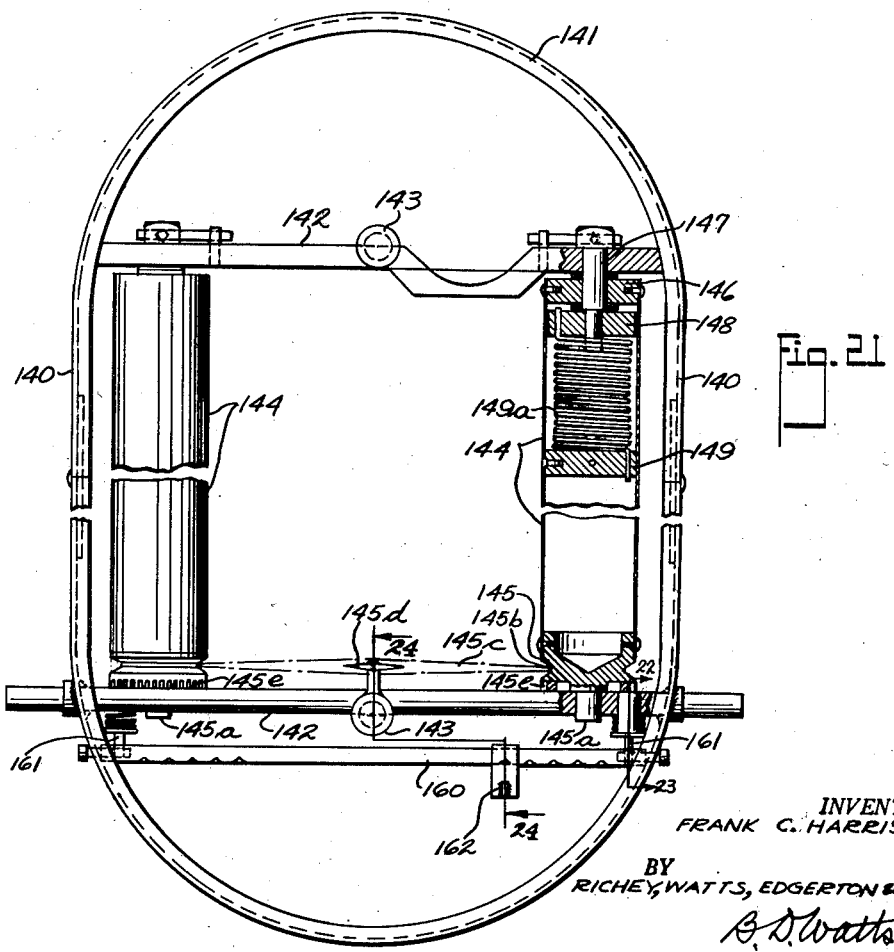

July 2, 1957        F. C. HARRIS        2,797,825
APPARATUS FOR HANDLING ARTICLES
Filed March 16, 1953        13 Sheets-Sheet 10
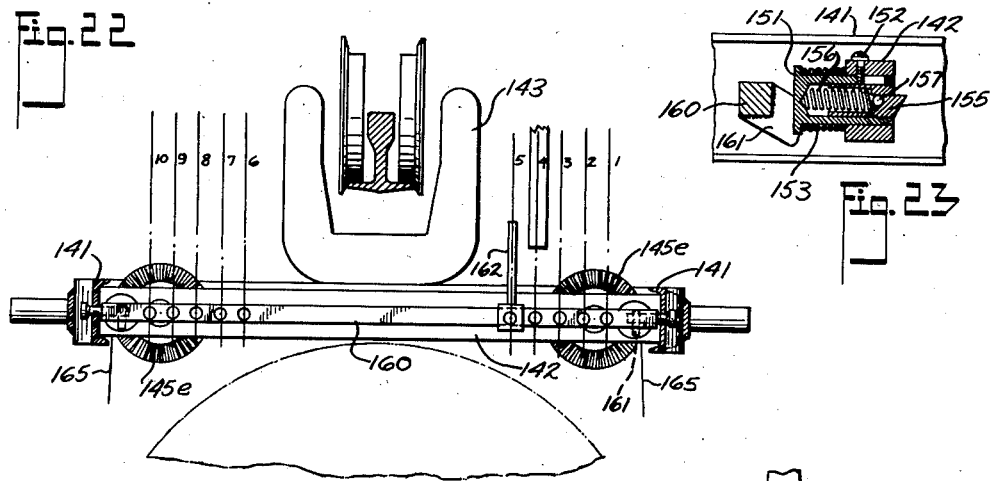
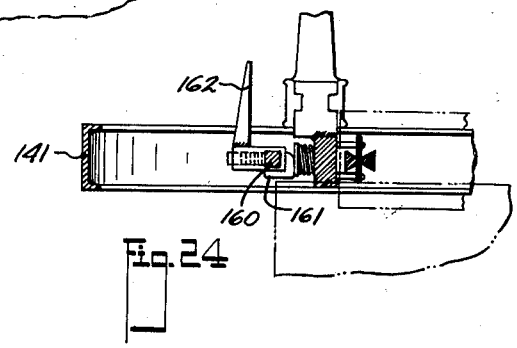
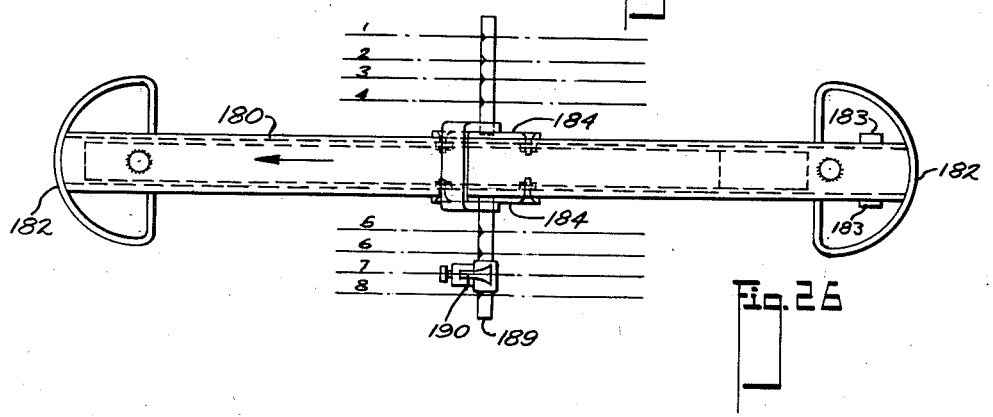
INVENTOR.
FRANK C. HARRIS
BY
RICHEY, WATTS, EDGERTON & McNENNY
ATTORNEYS

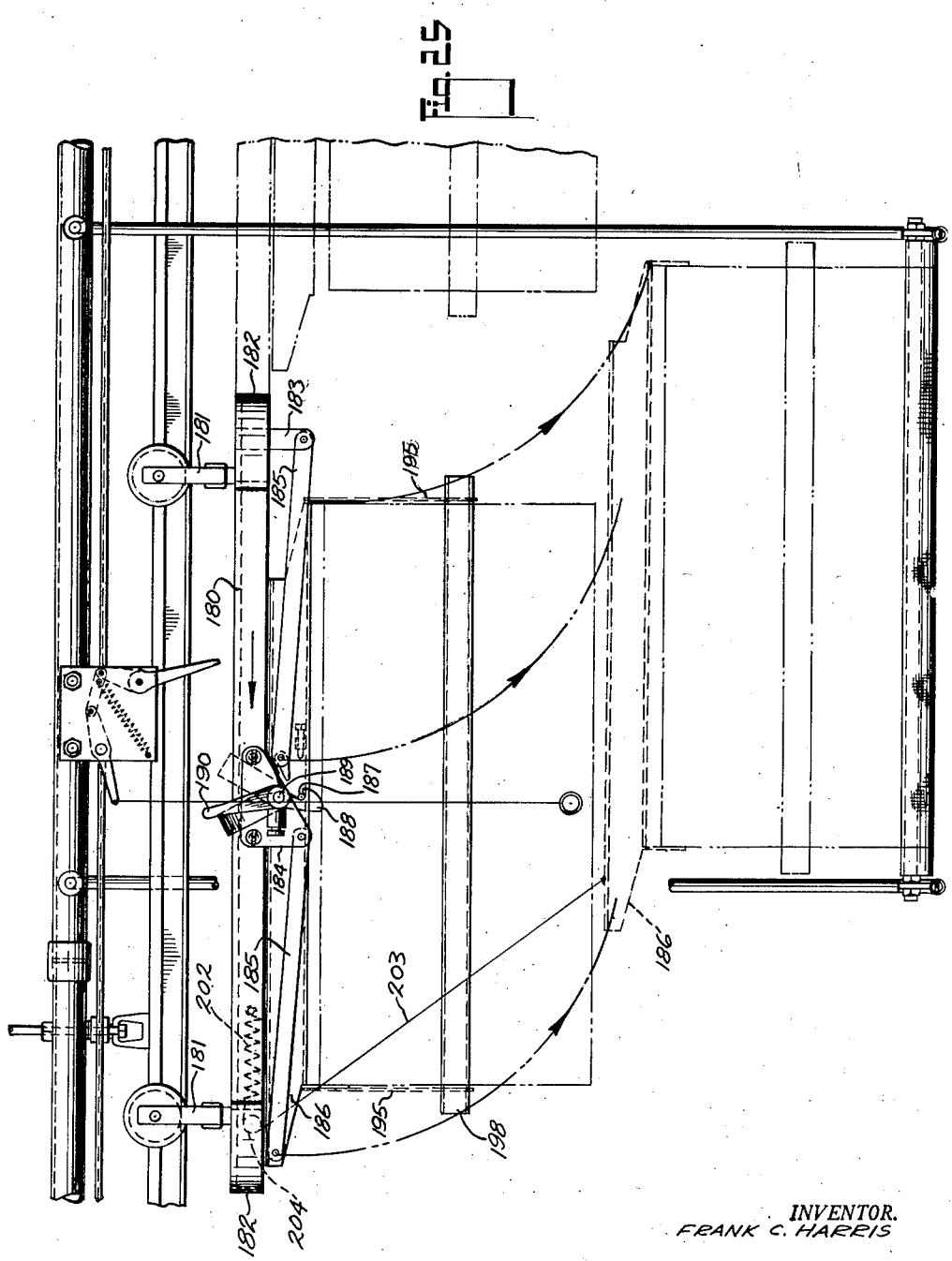

July 2, 1957 F. C. HARRIS 2,797,825
APPARATUS FOR HANDLING ARTICLES
Filed March 16, 1953 13 Sheets-Sheet 12
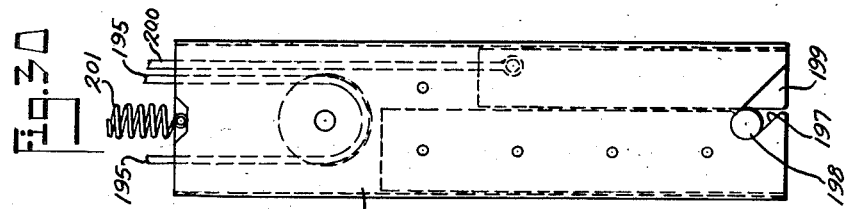
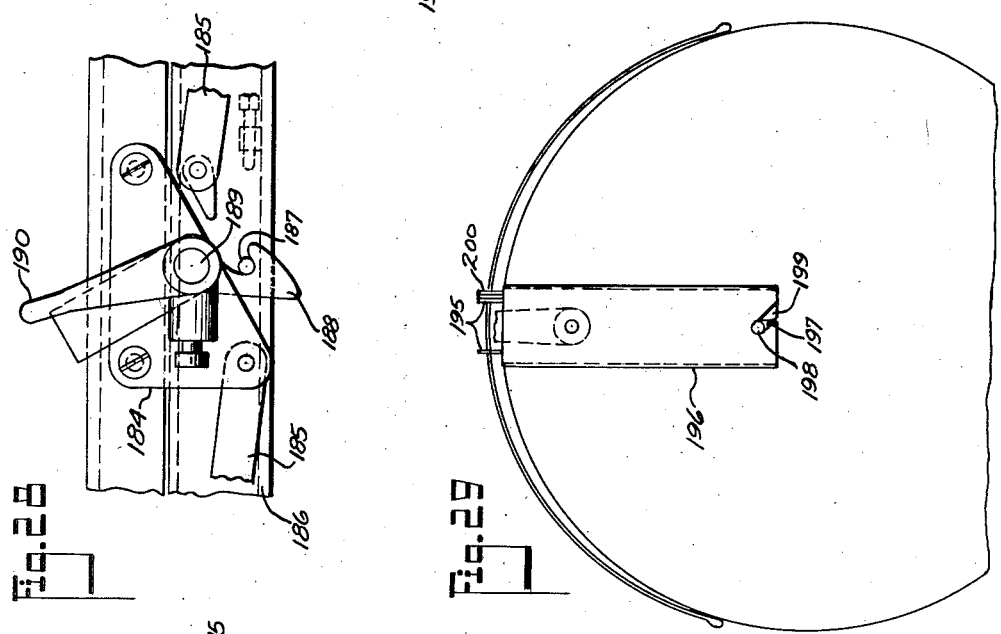
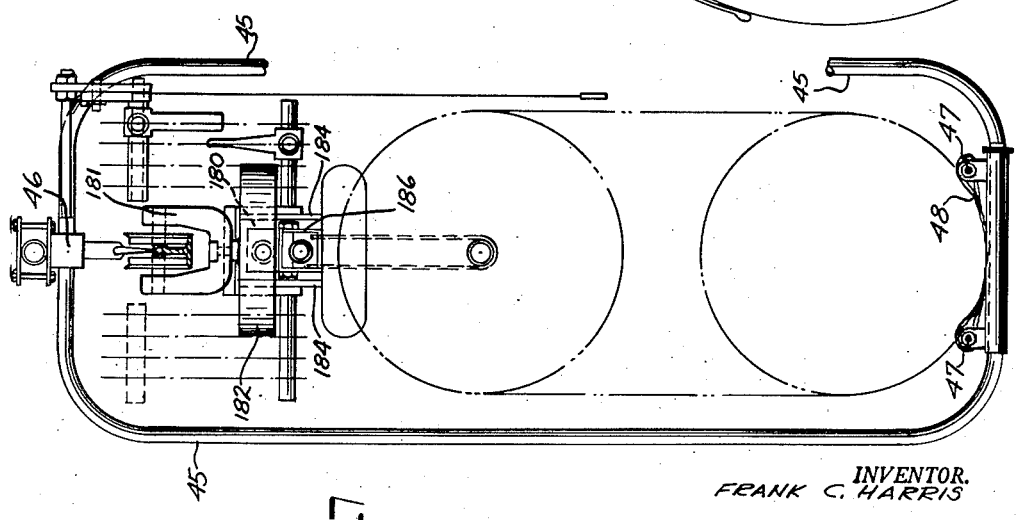
INVENTOR.
FRANK C. HARRIS
BY
RICHEY, WATTS, EDGERTON & McNENNY
ATTORNEYS

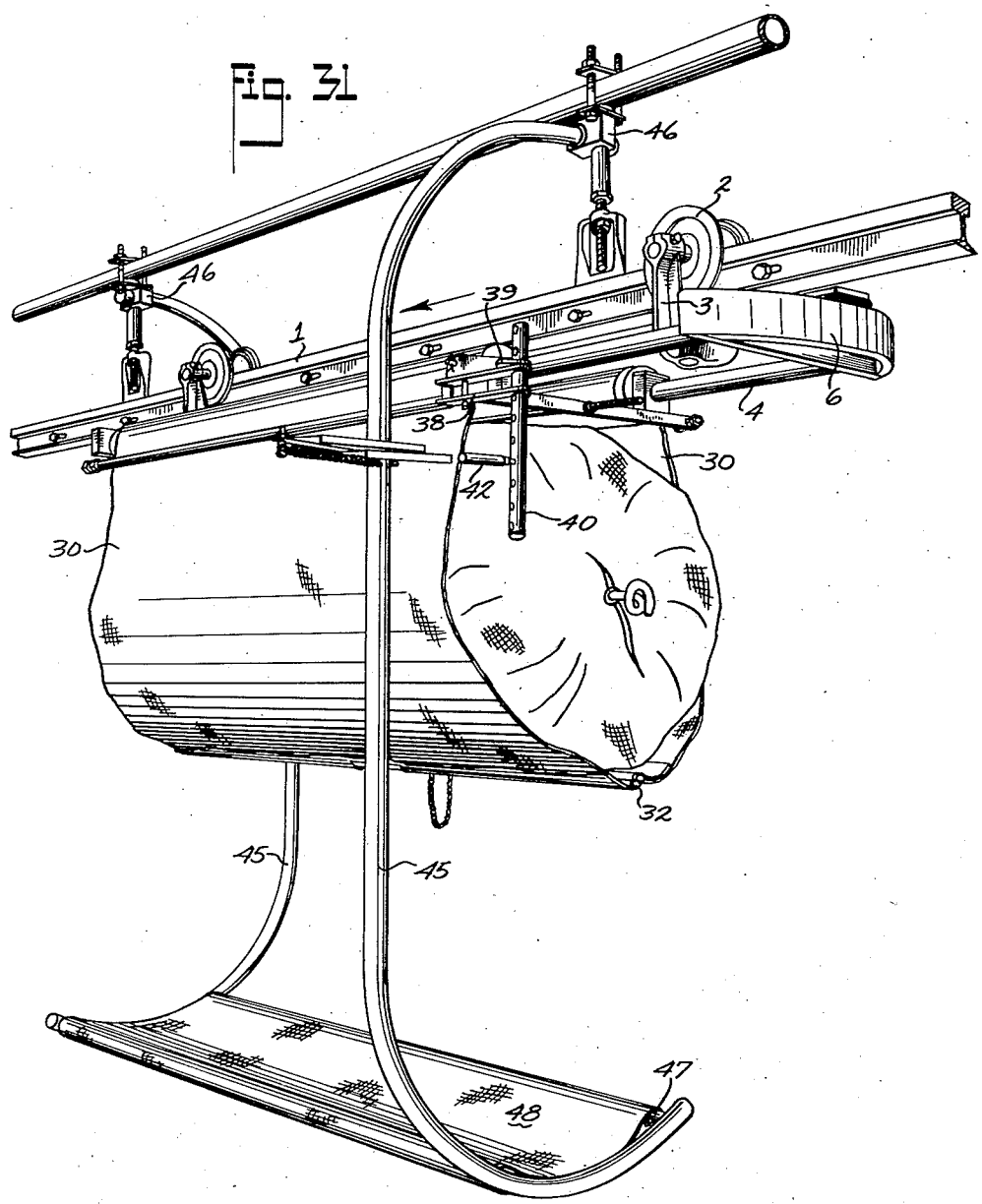

United States Patent Office 2,797,825
Patented July 2, 1957

2,797,825

APPARATUS FOR HANDLING ARTICLES

Frank C. Harris, Bay Village, Ohio, assignor to The American MonoRail Company, Cleveland, Ohio, a corporation of Ohio Application March 16, 1953, Serial No. 342,346

14 Claims. (Cl. 214—60)

This invention relates generally to the art of handling materials and is particularly concerned with new apparatus for handling picker laps in textile mills.

There are many instances in industry where articles of various types, sizes and shapes are to be transported to predetermined places. For example, articles packed in fiber boxes, small articles like grain packed in bags, articles in wooden boxes, fragile things like radio and television chassis and cylindrical articles such as rolls of textile fabric or picker laps. It is convenient to transport the foregoing illustrative articles and many others by suspending them from a carriage supported on an overhead rail. However, the efficiency of such apparatus depends on automatic discharge of the articles from the carrier when they reach desired positions along the line of travel of the carrier. In some instances it is desirable to transport from one place similar articles, differing in grade, and automatically to segregate them by grades at remote places. In other instances it may be desirable to transport widely different articles from the same or different places and to deliver them automatically at other places. In still other instances it may be desirable to transport a succession of like articles from one place and to deliver them automatically at a plurality of places when space is available for them at such places.

While the present invention has wide application as is indicated by the few foregoing illustrations, it is of particular value in handling picker laps. Accordingly, the invention will be specifically described in its application to handling such laps but it is to be understood that the invention is not to be limited thereto but is to extend to all the uses to which it is suitable.

In textile mills, picker laps are formed by rolling the thick, wide, continuous web of loosely associated fibers coming from the picker machines about a cylindrical mandrel or core to form a cylindrical roll of such webbing weighing fifty pounds or more. It is quite important that these picker laps should be so handled that the webbing is not compacted and disarranged and that it may be unrolled at the carding machine and converted into undamaged sliver. Rough handling such as bumping, dropping or scuffing the lap should be avoided because of the resulting undesired effects on the lap and sliver.

Numerous efforts have been made heretofore to devise apparatus for articles such as have been referred to above and particularly for handling picker laps and transporting them to carding machines but, so far as I know, none of these efforts has been entirely satisfactory.

The present invention aims to provide new apparatus for handling articles particularly picker laps. By this invention, picker laps are transported past receivers positioned adjacent to a plurality of carding machines and are automatically delivered to predetermined receivers. The picker laps are carried at an elevation high enough to clear the tops of previously delivered laps resting on the receivers preliminary to being placed in operative position on carding machines and when a lap reaches a receiver to which it is to be delivered, the lap is automatically lowered onto the receiver, preferably in a substantially vertical direction to avoid scuffing of the lap when it engages the receiver. Such substantially vertical movement may be attained either by moving the picker lap in a direction opposite to the direction of movement of the lap carrier and at substantially the same speed as that of the carrier while lowering the lap, or by slowing or substantially stopping the forward movement of the carrier while lowering the lap. Also, scuffing may be minimized by employing receivers which can shift to a limited extent in the direction of forward movement of the lap as it contacts the carrier.

Apparatus embodying the present invention may take any one of numerous forms but comprises a frame suspended from trolleys depending from an overhead track, a pair of flexible, article-supporting means movable vertically below said frame to be connected together below an article cradled thereon, latch means which prevent the lowering of an article carried by the supporting means and means for releasing the latch means and permitting lowering of the article.

The release means or trigger is shiftable to different positions where it will engage abutments or trippers disposed adjacent to the receivers. By suitably locating the trigger and setting the trippers, articles may be deposited on predetermined receivers, as and when desired. For example, the trippers on several lap receivers may be set to engage the triggers on enough carriers to keep the card machines served by those receivers supplied with laps. Similarly, another set of triggers and trippers may be set to supply laps to another set of receivers. When the triggers and trippers have been so set, laps will be automatically delivered to receivers requiring them, the operator at the picker machine having merely to reset the triggers when the carriers are loaded with laps and the card machine attendant having merely to reset the trippers when he removes laps from the receivers.

The present invention will be better understood by those skilled in the art from the following detailed description of various embodiments of the present invention taken in conjunction with the accompanying drawings, in which:

Fig. 1 is a side, elevational view of one form of apparatus embodying the present invention;

Fig. 2 is a top, plan view of the apparatus shown in Fig. 1;

Fig. 3 is a vertical, cross-sectional view taken on line 3—3 of Fig. 2;

Fig. 4 is a vertical, longitudinal section taken on line 4—4 of Fig. 2;

Fig. 5 is an elevational view, partly in section, taken on line 5—5 of Fig. 4;

Fig. 6 is an enlarged, fragmentary, side elevational view of the selector and release mechanism, or trigger, of Fig. 1;

Fig. 7 is a top, plan view of the apparatus of Fig. 6;

Fig. 8 is an enlarged, fragmentary, transverse view, partly in section, taken on line 8—8 of Fig. 6;

Fig. 9 is a top, plan view, with hidden parts indicated, of one form of latch release means or tripper;

Fig. 10 is a side, elevational view of a modified form of apparatus embodying the invention;

Fig. 11 is a top, plan view of the apparatus of Fig. 10;

Fig. 12 is a transverse view, partly in section, taken on line 12—12 of Fig. 11;

Fig. 13 is a fragmentary, vertical view, partly in section, and with parts omitted, taken on line 13—13 of Fig. 11;

Fig. 14 is a side elevation of a modified form of tripper;

Fig. 15 is a side, elevational view of another modified form of apparatus embodying the present invention;

Fig. 16 is a top, plan view of the apparatus of Fig. 15;

Fig. 17 is a vertical view, partly in end elevation and partly in section taken on line 17—17 of Fig. 16;

Fig. 18 is a vertical, sectional view taken on line 18—18 of Fig. 16;

Fig. 19 is a fragmentary, top plan view of the cradle interlocking means of Figs. 15 to 18;

Fig. 20 is a side, elevational view of another modified form of apparatus embodying the present invention;

Fig. 21 is a top, plan view of the apparatus of Fig. 20 with parts cut away;

Fig. 22 is a fragmentary, front end elevational view of the apparatus of Figs. 20 and 21;

Fig. 23 is a vertical, sectional view taken on line 23—23 of Fig. 21;

Fig. 24 is a vertical, sectional view taken on line 24—24 of Fig. 21;

Fig. 25 is a side elevational view of a further modification embodying the present invention;

Fig. 26 is a top, plan view of the apparatus of Fig. 25;

Fig. 27 is an end elevational view of the apparatus of Figs. 25 and 26 with a picker lap shown in position on the carrier and another on a receiver;

Fig. 28 is an enlarged, elevational view of the mandrel latch of Fig. 25;

Figs. 29 and 30 are elevational views of a modified form of mandrel supporting and releasing device;

Fig. 31 is a perspective view of the receiver shown in Figs. 1 and 27; and

Figs. 32 and 33 are sectional views taken on lines 32—32 and 33—33, respectively, on Fig. 1.

The apparatus shown in Figs. 1 to 8, inclusive, comprises an overhead track 1 on which trolley wheels 2 run. A yoke 3 connects the wheels 2 in pairs and two of such yokes support a carrier frame or carriage designated generally by F. This frame consists of a pair of parallel rods 4, a transverse end member 5 provided with an arc-shaped bumper 6 and a bar 7 pivotally connected with one yoke 3 and a transverse end member 8 provided with an arc-shaped bumper 9. A bar 10 is connected to bumper 9 and extends over member 8, to which it is attached, and is pivotally connected to the other yoke 3.

A movable frame, designated generally by M, consists of cross members 15 provided with sleeve bearings 16 surrounding rods 4 of the carrier frame and slidable thereon and tie rods 17 connecting the cross members 15 together with a predetermined space therebetween. It will be understood that the movable frame M may slide endwise on side rods 4 of the carrier frame.

Tension springs 18 are connected at one end to end member 8 of the carrier frame and at the other end to the remote cross member 15 of the movable frame. When the frame M is moved endwise on the carrier frame to tension these springs and is then released, the latter will return the movable frame to the position shown in Fig. 2.

Tubular cylindrical rollers 20 surround side rods 4 of the carrier frame and are provided with ball bearings 21 which are secured in the ends of the rollers and which rest on sleeve bearings 16. These bearings 21 are disposed between and closely adjacent to the cross members 8 and 15 of the movable frame M. A spiral bar 22 is positioned within and secured to each roller 20, one spiral bar constituting a left-handed cam while the other constitutes a right-handed cam. A torsion spring 23 encircles side rod 4 within each roller 20 and has one end anchored to block 24 which is fixed to rod 4 and the other end anchored to a ring 25 which is rotatable on side rod 4, carries a stop 26 engageable with a pin 27 fixed to the side rod 4 and is provided with a rotatable cam follower 28 which is engageable with the spiral cam 22. It will be understood that when roller 20 is rotated in one direction the spiral cam will engage cam follower 28 which will cause the roller 20 to move endwise. The direction of the spirals 20 is such that this endwise movement is in a direction opposite to that in which the carrier frame travels. Preferably the torsion springs 23 are initially tensioned so that whenever the rollers 20 are free to rotate they will carry the force of the springs 23 acting through cam follower 28, will cause the rollers 20 to rotate to a predetermined extent to insure that the load carrier depending from the rollers will clear articles delivered by a preceding carrier.

A flexible carrier depends from said movable frame. It consists of curtains 30 connected at one end to rollers 20 and provided at their lower ends with rods 31 to each of which is affixed a trammel or clip 32 which is engageable with the other rod 31. The rollers and curtains are spaced apart transversely of the carrier by a distance nearly equal to the diameter of a picker lap and are elongated longitudinally of the carrier for a distance preferably exceeding the axial length of the lap. Each of these clips 32 is connected to a chain 33 which is fastened at its upper end to tie rods 17.

It will be understood that the curtains 30 may be pulled down around a picker lap and connected together beneath the lap by means of rods 30 and clips 32 and the lap may be carried by these curtains acting in the fashion of a sling; and that when rollers 20 are freed from restraint they will be rotated by the weight of the lap and will lower the lap. When the curtains have been lowered to the extent that the chains 33 become taut, the clips 32 and their rods 31 will be rotated thereby disengaging the curtains from each other and permitting the lap to fall.

In Figs. 6, 7 and 8 is shown latch or trigger means for restraining rotation of the rollers 20. This latch means includes a pin 35 which projects through a part of cross member 15 and bearing 16 and into a depression in side rod 4. This pin 35 is pivoted at its outer end to a lever 36 and a spring 35a surrounds pin 35 and is pressed against cross member 15 and the pivot pin connecting pin 35 to lever 36. Lever 36 is mounted on a vertical pivot pin 37 supported by latch frame 38 which, in turn, is connected to cross member 15 outside of one tie rod 17. The end of lever 36 remote from pin 35 is engageable with a cam 39 which is connected to and rotatable with a tube 40 extending vertically through frame 38. This cam 39 also serves as a shoulder on tube 40 which rests on the top of frame 38 and thus fixes the tube 40 against vertically downward movement. Tube 40 has a plurality of horizontal holes 41 to receive a latch release means or trigger 42 which may be placed in any one of these holes to engage with a latch release means or trippers fixed to the lap receivers adjacent to each of the card machines.

One of the tubes 45 carries a latch release or tripper mechanism (see Figs. 9 and 31). This tripper comprises a U-shaped bracket 50 attached to a block 51 which may be secured in predetermined position on one of tubes 45, as by means of a set screw 51a, and a hairpin-shaped bar 52, the free ends of which are connected together. This bar is positioned within the U-shaped bracket 50 for endwise sliding movement and a pivot pin 53 extends through the looped end of the bar. A detent 54 projects through both legs of the bar 52 and is connected thereto. This detent has a side surface to engage a stop 55 attached to bracket 50, beveled end surface 56 to engage with block 51 and a beveled end surface 57 to clear stop 55 when the bar 52 has been moved laterally to disengage detent 54 from stop 55. A tensioned spring 58 is connected at its ends to pivot pin 53 and to detent 54.

It will be understood that when the latch parts are in the position shown in Figs. 7, 8 and 31, which is the position prior to loading the curtains 30 with a lap and during transportation of the lap, rotation of the rollers 20 will be prevented by pin 35 which extends through the bearing 16 of one roller and into the side rod 4, this latch being maintained in that position by engagement of the lever 36 with cam 39 substantially as shown in Fig. 7. When the carrier frame moves the trigger 42 into contact with the tripper 52 both trigger and tripper are moved simultaneously. The trigger 42 and cam 39 will be moved counterclockwise as viewed in Fig. 7 through substantially 90° with coincident pivotal movement of lever 35 about its pivot 37 and engagement of the lever on surface 39a of the cam and endwise movement of pin 35 out of its seat in side rod 4 and out of bearing 16. Trigger 42 will remain in the just described position while lever 36 is urged against cam surface 39a by spring 35a and will thus not contact any trippers which the carrier may subsequently pass while the trigger is in this idle position.

At the same time tripper 52 will be moved about pin 53 until detent 57 clears stop 55 and the beveled surface 56 engages block 51 whereupon bar 52 is moved endwise into bracket 50 by spring 58 so that it no longer projects into the path of triggers of approaching carriers.

From the foregoing description of the trigger, the tripper and their operations, it will be understood that after a trigger is tripped it does not, and must not, engage any other tripper until it is manually reset and that the tripper which trips that trigger does not, and must not, engage any other trigger until it is manually reset. By rendering both the trigger and tripper inoperative to engage another until reset, a plurality of carriers may pass a plurality of receivers where no discharge is desired without discharging any of the loads carried thereby.

It will be understood that the operation of the hereinafter disclosed triggers and trippers is substantially that just described.

When pin 35 moves out of its seat in roller 4, the weight of the lap in the sling comprising curtains 30 will cause the rollers to rotate with consequent lowering of the lap. As the lap is lowered and rollers 20 rotate the cams 22 move along followers 28 and rollers 20 are moved endwise in a direction opposite to that of the travel of the carrier frame, i. e., the movable frame moves rearwardly while the carrier frame is going forwardly. Since the rearward movement of the movable frame is at practically the same speed as the forward movement of the carrier frame, the lap is lowered and, when the curtains are disconnected by chains 30, is dropped substantially vertically through a distance of but a few inches onto a receiver.

During the rearward movement of the movable frame the springs 18 are stretched or tensioned and when the lower ends of the curtains have been disconnected and the movable frame is free to move forwardly, springs 18 return frame M to its forward position which is shown in Fig. 1. Immediately upon disconnection of the lower ends of the curtains 30, the pretension of the torsion springs 23 exerts force through cam follower 28 on spiral cams 22 and causes them to rotate in a direction to wind up the curtains 30. While this pretensioning is adjustable, it is preferable that sufficient pretensioning be applied to raise the lower ends of the curtains 30 so that they will not engage with previously deposited laps on the receivers over which the carrier frame passes after depositing a lap. This vertical movement of the curtains need not be extensive, about eight inches upward movement being sufficient to clear the tops of laps of the present current size inasmuch as when the curtains hang vertically they are nearly as far apart as the diameter of a lap, as will be better understood by reference to Fig. 3.

As appears in Figs. 1 and 31 to 33, the receiver may consist of two similar roughly C-shaped tubes 45 secured at their upper ends to hangers 46, which support the track 1, and depend on opposite sides of the track and are far enough apart to permit a frame and a lap to pass between them. These tubes are preferably spaced apart along the track a distance greater than the length of a lap so that the latter may be removed easily from the receiver without interference with either tube 45. Preferably the upper ends of the tubes extend through cylindrical holes in hangers 46 which may be fitted with bearings 46a for free rotation of the tubes therein and pins 46b serve to hold the tubes in assembled position in the hangers. At their lower ends, tubes 45 are connected by tubes 47 over which a cloth 48 is fastened to receive the lap. A suitable manner of connecting the tubes 45 and 47 is shown in Fig. 33 where cylindrical posts 45a are welded to tubes 45 and project into the ends of tubes 47 and are attached thereto by pins 47a. Since the connections of tubes 45 to tubes 47 are loose and tubes 45 may turn to some extent in hangers 46, the receiver may move slightly with a lap and thus cushion the contact of one on the other.

Another embodiment of the present invention is shown in Figs. 10 to 14, inclusive, the receiver which may be like that shown in Fig. 1 having been omitted.

In the present modification the carrier frame consists of a front end member 60 pivotally secured to a trolley yoke 61, and a rear end member 62 having an arcuate bumper 63 attached thereto. A plate 64 connected to members 63 and 62 extends forwardly and is pivotally supported by another trolley yoke 61. Side rods 65 connect the end members 60 and 62 together in predetermined spaced position.

A movable frame consists of front cross member 66 slidably mounted on side rods 65, sleeves 67 attached at one end to member 66 and loosely slidable on side rods 65 and rollers 68 bearing races at one end secured on sleeves 67 and races 69 at the other end mounted on sleeve bearings 70 which are slidable on side rods 65. The sleeve bearings for the races of the rollers 20 and 68 may consist of nylon. It will be noted that the outer races 71 of the ball bearings are fixed in position in the roller 68 as by rivets and indentations 72 and 73, respectively. Rods 74 are connected at their ends to end members 60 and 62 of the carrier frame and pass through movable cross member 66. Compression coil springs 74a surround rod 74 and bear against member 66 and blocks 66a which are adjustably fixed on rods 74.

It is to be understood that the rollers 68 are equipped with spiral cams, cam followers and torsion springs and associated parts such as are shown in Fig. 4 and are needed to cause rotation of the rollers as described above in connection with the apparatus of Figs. 1 to 9, inclusive.

Flexible curtains 75 are attached at one end to rollers 68 and are provided with tubes 76 extending parallel to the top edge and disposed approximately midway between the upper and lower ends of the curtains and with other similar tubes 77 at the lower edges of the curtains. These latter rods are provided with trammels or clips 78 for interengaging the tubes 77 to connect the lower ends of the curtains together and each tube is provided with a lever 79 by which it and its trammel may be rotated to disengage the curtains. Line 80 is attached to the front carrier member 66 and carries a ring 81 at its lower end. Lines 82 extend from ring 81 to tubes 76 and lines 82a extend from ring 81 to levers 79.

The forward cross member 66 of the movable frame carries a plurality of triggers 83, each of which has a notch 84 to receive the bar 85 which is connected to the carrier frame adjacent to end member 60. When the trigger 83 is moved to the latching position shown in full lines in Fig. 13, the movable frame will be connected to the carrier frame for forward movement therewith.

Fig. 14 shows a modified form of latch release means comprising a bracket 86 to be fixed in predetermined position on a receiver rod 45 (see Fig. 1) as by a set screw, and a tripper 86 pivoted to bracket 87 and urged toward the dotted line position by spring and having a detent 88 to abut against an endwise stop 89 containing a compression spring urging the stop toward the left in Fig. 14.

When the carrier frame moves along a track and reaches a receiver onto which is to be deposited a picker lap carried by the curtains 75, acting as a sling, trigger 83 contacts tripper 87 and is moved by the latter until the trigger is clear of bar 85, whereupon the weight of the lap rotates rollers 68 and the cam follower urges the rollers endwise in a rearward direction at about the speed of the forward movement of the carrier frame. While trigger 83 is being so moved by tripper 87, the latter is being pivoted against the resistance of its spring with gradual withdrawal of detent 88 from engagement with stop 89 and endwise retracting movement of the stop so that trigger 87 may then pivot through about 90° where it will not engage the triggers on any carrier until reset by moving stop 89 in the opposite endwise direction to the position shown in Fig. 14.

When the curtains reach the lowered position where lines 80 and 82a become taut, the clips 78 are disengaged and the lap falls substantially vertically onto the receiver. The rearward movement of the movable frame compresses spring 74a and, when the lap is dropped, serves to return the movable frame to its forward position.

When the device is to be loaded with another lap, the trigger 83 is reset to engage bar 85 and the carrier is then ready to be loaded with another lap.

Another embodiment of the present invention is shown in Figs. 15 to 19, inclusive.

In this embodiment the carrier frame comprises cross members 100 and 101, side members 102 and a longitudinal rod 103 pivotally supported by two trolley yokes 104. Brackets 105 are connected to the inner side of side member 102 near the rear end of the carrier frame. Sheaves 106 are mounted on the inner side of side members 102 to the rear of and close to brackets 105. A shaft 107 is mounted for rotation in side members 102 and carries pulleys 108 adjacent to the inner sides of side members 102. A trigger shaft 110 is rotatably supported in side members 102 and has a plurality of holes for receipt of a trigger 111. Tensioned springs 112 are attached at their ends to brackets 105 and clevices 113 in which pulleys 114 are rotatably mounted.

Flexible curtains 115 have tubes 116 at their upper ends and tubes 117 at their lower ends. Flat wires 118 and 119 are connected at their ends to frame member 100 and to the upper rods 116. These wires extend from member 100 over the top of sheaves 108, around pulley 112, and then around sheave 108, after which wire 118 horizontally over sheave 105 and down to the rear end of tube 116 and wire 119 goes vertically down to the front end of tube 116.

The lower tubes 117 of the curtains 115 are provided with clips 120 for connecting the lower ends of the curtains together and levers 121 for disconnecting the curtains when the descending curtains make taut lines 122 connected to the frame and to the levers 121. Arms 125 depending from side members 102 of the carrier frame have pivotally connected thereto one end of the arms 126, the other end of which is pivotally connected to tubes 116 at the upper edges of the curtains. These arms move the curtains rearwardly as they are lowered, thus making possible the substantial vertical movement of the lap onto a receiver.

Shaft 107 has a ratchet wheel 130 attached thereto and trigger shaft 110 has a pawl 131 engageable with the ratchet wheel to prevent rotation in a direction to permit lowering of the curtains 115 and the lap supported thereby. When trigger 111 engages a tripper (not shown) on a receiver at a card machine, the pawl is disengaged from the ratchet wheel whereupon the weight of the lap causes the sling formed by curtains 115 to move downwardly. This downward movement is controlled by the swinging of arms 126 and, hence, the lap moves downwardly and rearwardly meanwhile moving pulleys 114 toward sheaves 108 and tensioning springs 112. When the sling has reached its lowermost position as determined by the trip lines 122, the clips are disengaged and the lap drops onto the receiver. When the lap has been discharged springs 112 contract and return the pulleys 114 and curtains to their preloaded position, shown by the dotted lines which are the full lines which denote the loaded position, thereby raising tubes 117 to a safe level above the discharged laps. The device is then ready for resetting of the trigger and reloading with another lap.

Still another modification of the invention is shown in Figs. 20 to 24, inclusive. In these figures the carrier frame consists of straight, parallel sides 140, curved ends 141, the sides and ends preferably consisting of a single channel member bent into the described shape and having its ends welded together; and cross members 142 attached at their ends to the channel member and extending transversely at the ends of the parallel sides of member 140. These cross members 142 are pivotally connected by swivels 143 to trolley yokes 143a which, in turn, are supported by trolley wheels which run on an overhead track. Adjacent to each side part 140 of the carrier frame, hollow cylindrical rollers 144 are rotatably mounted. As shown, a hub 145 is secured in one end of each roller. Each hub has a shaft portion 145 projecting therefrom to extend into and have bearing in an opening in the adjacent cross member 142, has a V-shaped groove 145b to receive a V belt 145c which engages a belt deflector 145d, and has ratchet teeth 145e to engage with a suitable pawl, presently to be described. Disks 146 are secured in the opposite ends of the rollers and are rotatably mounted on shafts or rods 147 which extend through the other cross member 142 and have disks 148 attached at their inner ends. A disk 149 is disposed within and secured to each roller between its ends. The ends of torsion springs 149a are attached to disks 148 and 149.

A latch means for rollers 144 is supported by cross member 142 adjacent to the ratchet teeth on hubs 145. Each trigger device (Figs. 23 and 24) includes a sleeve 151 which may slide endwise in a cylindrical aperture in frame member 142. The movement of this sleeve is limited by a pin 152 which extends through the frame 142 and into a slot in the sleeve. The outer end of sleeve 151 is closed. A spring 153 extends between the end closure of the sleeve 151 and frame 142 to urge the sleeve endwise outwardly. A pawl 155 is slidable endwise in sleeve 151, is urged inwardly toward the ratchet teeth by spring 156 disposed between the pawl and the closed end of sleeve 151 and is restricted in the extent of its movement by pin 157 which is carried by the pawl and projects into slots in sleeve 151. The inner end of the pawl 155 is engageable with the ratchet teeth 145e on the adjacent hub 145 and permits rotation of the roller in one direction while preventing rotation in the opposite direction.

A trigger shaft 160 extends transversely of, and is rotatably mounted in its ends, in the carrier frame. This shaft is disposed adjacent to the outer ends of sleeve 151 and carries cams 161 which are movable into and out of engagement with the outer ends of sleeves 151 when shaft 160 is rotated. These cams hold the pawls 155 in engagement with the ratchet teeth 145e when rotation of the rollers 144 is to be prevented and permits springs 153 to withdraw the pawls when rotation of the rollers is desired. A trigger 162 is carried by trigger shaft 160 and may be shifted to any of several different positions so as to engage with trippers adjacent to carding machines where picker laps are to be deposited. This trigger may be actuated by a tripper, such for example, as the tripper of Fig. 9 or of Fig. 14 to rotate shaft 160.

Flexible curtains 165 attached at their upper ends to rollers 144 and have tubes 166 at their lower edges. Each tube is provided with a clip 167 and a lever 168. These levers are attached to clip chains 169 which, at their opposite ends, are anchored to the carrier frame and which serve to disconnect the clips when the curtains have been lowered to a predetermined extent.

It will be understood that when a cylindrical article such as a picker lap is to be handled by the apparatus of Figs. 20 to 24, inclusive, the carrier is moved over a picker lap, the curtains 165 are pulled down underneath the lap and the trammels are connected together. The pawls 155 being in engagement with ratchet teeth 145e prevent lowering of the curtains and lap. When the carrier has transported the picker lap to the card machine where a lap is needed, a tripper suitably positioned adjacent to that card machine engages with trigger 162 and rotates the trigger shaft 160, thereby moving cams 161 out of contact with sleeves 151 whereupon springs 153 move sleeves 151 and pawls 155 outwardly, thus releasing the rollers for rotational movement. The weight of the picker lap causes the rollers to rotate and when the curtains have moved down to the extent of the length of the trammel chains, the trammels are actuated to disconnect the curtains and allow the picker lap to drop onto a receiver therebeneath.

A further modification is shown in Figs. 25 to 30.

In these figures the carrier frame comprises a channel member 180 with down-turned flanges and pivotally connected near its ends to trolley yokes 181 and provided with curved bumpers 182 at each end. Brackets 183 and 184 extend downwardly on the outsides of the flanges of channel 180 and pivotally attached thereto are arms 185. The other ends of arms 185 are pivotally connected to a movable frame, preferably comprising a hollow bar 186 rectangular in cross-section. A pin 187 which projects outwardly from one side of frame 186 is engageable with the hooked end of a lever 188 which is keyed to a shaft 189, the latter extending outwardly from and being rotatably supported by frame 180. A trigger 190 is adjustable to various positions lengthwise of shaft 189 and, when moved by a tripper adjacent to a lap receiver, serves to rotate shaft 189 and free pin 187 from hook 188 and thereby permit the movable frame 186 to move downwardly and rearwardly under control of the arms 185.

Cables 195 are attached to the movable frame and at their lower ends are connected to mandrel latches 196 which are provided with notches 197 to receive the mandrel 198 of a picker lap. Keepers 199 slidable endwise in latches 196 serve to retain the mandrel 198 in the mandrel latches until the keepers 199 are moved upwardly endwise, which action is brought about by cables 200 connected to keepers 199 and to the carrier frame. The length of cables 200 is adjusted so that they will become taut and will move keepers 199 to a position where mandrel 198 is released when the lap carried by cable 195 has reached the lowermost desired position.

Tensioned springs 201 are connected to the mandrel latches 196 and to the movable frame 186 to retract these latches upwardly as soon as they have been freed from the lap mandrel so that the latches will not drag across a lap on a receiver and disarrange the fibers of the lap.

The frame 186 is restored to normal unloaded position by spring 202 attached at one end to member 180 and at the other end to a cable 203 which passes over pulley 204 and is connected to frame 186.

It will be understood that various combinations may be made by selecting parts from the several described devices and making new combinations.

Having thus described the present invention so that others skilled in the art may be able to understand and practice the same, I state that what I desire to secure by Letters Patent is defined in what is claimed.

What is claimed is:

1. Article handling apparatus which comprises a carrier frame, means supported by said frame and movable relative to the frame and opposed to its direction of travel, article-supporting means connected at their upper ends to said movable means, latch means engageable with said movable means for fixing said supporting means against downward movement, and trigger means engageable with and acuatable by a tripper for actuating said trigger and releasing said latch means.

2. Article handling apparatus which comprises a carrier frame, means supported by said frame and movable relative to the frame and opposed to its direction of travel, article supporting means connected at their upper ends to said movable means, latch means engageable with said movable means for fixing said supporting means against downward movement, trigger means engageable with and actuatable by a tripper for actuating said trigger and releasing said latch, and means actuated by engagement of a trigger and a tripper for rendering both ineffective thereafter until reset.

3. Article handling apparatus which comprises a carrier frame, means supported by said frame and movable relative to the frame and opposed to its direction of travel, article-supporting means connected at their upper ends to said movable means, interengageable means at their lower ends, fixed means attached to said interengageable means for disengaging them near their lowermost position, latch means engageable with said movable means for fixing said supporting means against downward movement, trigger means engageable with and actuatable by a tripper for actuating said trigger and releasing said latch means, and resilient means operatively associated with said article-supporting means to urge them upwardly.

4. Article handling apparatus which comprises a carriage frame, trolleys pivotally connected to said frame near its ends and adapted to run on an overhead track and suspend the frame therefrom, means supported by said frame and movable relative to the frame and opposed to its direction of travel, article-supporting means depending from said movable means, latch means engageable with said movable means for fixing said supporting means against lowering movement of an article carried thereby and release means engageable with and actuatable by an abutment for releasing said latch means.

5. Apparatus for handling cylindrical articles which comprises a carrier frame, trolleys pivotally connected to said frame and adapted to run on an overhead track and to suspend the frame therefrom, tubular, cylindrical rollers longitudinally mounted in said carrier frame, flexible members secured at one end to said rollers and having connectible means at the other end to be connected together to form a sling for a cylindrical article, latch means engageable with said rollers to prevent rotation thereof when said sling is loaded with a cylindrical article, latch-release means engageable with and actuated by a fixed abutment adjacent to the place where a cylindrical article in the sling is to be delivered, and means attached to said connectible means for disconnecting them when the sling has lowered an article therein to a predetermined extent.

6. Apparatus for handling a picker lap which comprises a carrier frame having side rods, trolleys rotatably connected to said frame near its ends and adapted to run on an overhead track and to suspend the frame therefrom, tubular, cylindrical rollers rotatable about said rods supported by said frame, torsion springs within said rollers and secured to said rollers and to said rods, flexible members secured at one end to said rollers and having connectible means at the other end to be connected together to form a sling, latch means engageable with said rollers to prevent rotation thereof when said sling is loaded with a picker lap, a receiver for said picker lap, latch-release means engageable with a fixed abutment attached to said receiver, and means attached to said connectible means for disconnecting them when the sling has lowered an article therein in said receiver to a predetermined extent.

7. Apparatus for handling articles which comprises a carrier frame, trolleys rotatably connected to said frame near its ends and adapted to run on an overhead track and suspend the frame therefrom, a movable frame, means connecting said frames for movement of the movable frame endwise relative to said carrier frame, means supported by said movable frame for suspending an article therebelow, latch means supported by one of said frames for preventing relative movement of the frames when an article is suspended from the movable frame, latch-release means engageable with a fixed abutment adjacent to the place where such a suspended article is to be delivered, and means actuated by the weight of an article carried by said suspending means for moving said movable frame rearwardly relative to the forwardly moving carrier frame.

8. Apparatus for handling articles comprising a carrier adapted to be suspended from and run along an overhead track to move articles from a series of machines to any one of a succession of receivers and including a carrier frame, suspension means adapted to hold an article while being carried by said carrier, support means for said suspension means mounted on said carrier frame and adapted to raise and lower said suspension means, said support means being movable relative to said frame and opposed to its direction of travel, and release means adapted to be actuated by a tripper associated with a receiver to permit the suspension means to be lowered from the carrier to a point immediately above the receiver.

9. Apparatus for handling articles comprising a carrier adapted to be suspended from and run along an overhead track to move articles to any of a succession of receivers and including a carrier frame, suspension means each adapted to hold an article while being carried by said carrier, support means for said suspension means mounted on said carrier frame and adapted to raise and lower said suspension means, said support means being movable relative to said frame and opposed to its direction of travel, release means adapted to be actuated by a tripper associated with a receiver to permit the suspension means to be lowered from the carrier, the said means including trigger means adapted to be engaged by the tripper at any one of a number of positions along said track and corresponding to a predetermined receiver, and means for actuating the said suspension means to release the article held when the suspension means has been lowered to a position immediately above a receiver.

10. The invention in accordance with claim 9, in which the said support means comprises two rods fixed in the carrier frame, a cylindrical roll and a movable frame mounted on and adapted to slide along said rods, the said rolls being adapted to carry curtains for suspending the picker laps, a helical projection along the interior of each cylindrical roll and a sliding member on the rod and engaging the projection whereby rotation of the cylindrical roll moves the roll toward the rear of the frame and a spring connected to the rod and the sliding member for normally maintaining the roll in a position toward the front of the carrier and the said release means comprising a pin mounted in the movable frame and adapted to be withdrawn from a normal position of insertion in an opening in the rod whereby the rolls may slide along the rods and lower the suspension means.

11. The invention in accordance with claim 9, in which the said support means comprises two rods fixed in the carrier frame, a cylindrical roll mounted on and adapted to slide along each rod and a movable frame for the said rolls, each of the said frames including a transverse member, an elongated spring extending between the said carrier frame and the said movable frame for normally maintaining the roll and movable frame in a position toward the front of the carrier, the said transverse members being adjacent each other in that position, and the said release means comprising a plurality of latches spaced along one of the said transverse members and engaging the remaining transverse member.

12. The invention in accordance with claim 9, in which said support means comprises a shaft mounted on the carrier frame, two spaced support wires extending from the suspension means to the carrier frame and wound about the shaft so as to permit raising and lowering of the suspension means by rotation of the shaft, the said wires passing over a movable pulley and a spring connected to the carrier frame and to the pulley for maintaining the said suspension means in a normally raised position, an arm connected at one end thereof to the suspension means and at the remaining end thereof to the carrier frame to produce rearward movement of the suspension means as it is lowered and the said release means comprising a ratchet on the shaft and a pawl adapted to be withdrawn from a normal position of engagement with the ratchet, the said pawl being actuated by a transverse shaft adapted to carry a trigger and be rotated thereby.

13. The invention in accordance with claim 9, in which the said article support means comprises two cylindrical rolls mounted in the said carrier frame, the said rolls being adapted to carry curtains for suspending the articles, a torsion spring associated with each of the said rolls, each spring being connected at one end thereof to the roll and at the remaining end thereof to the frame for maintaining the suspension means in a normally raised position and the said release means comprising a ratchet wheel on each roll and a sliding pawl normally engaged with each ratchet wheel and a transverse member connected to the said pawls and carrying a trigger.

14. The invention in accordance with claim 9, in which said support means comprises two spaced, parallel arms, each arm being connected at one end to the suspension means and at the remaining end to the carrier frame, the said arms being adapted to move said suspension means toward the rear of the carrier frame as the suspension means is lowered while maintaining the suspension means at a generally horizontal position and the said release means comprising a latch, and a piece secured to the suspension means adapted to be engaged by the latch for supporting the suspension means and a transverse shaft carrying the latch and a trigger mounted on the shaft for rotating the shaft to release the latch.

References Cited in the file of this patent

UNITED STATES PATENTS

| | | |
|---|---|---|
| 15,300 | Morris | July 8, 1856 |
| 284,869 | Loveland | Sept. 11, 1883 |
| 706,246 | Marr | Aug. 5, 1902 |
| 878,797 | Harding et al. | Feb. 11, 1908 |
| 1,528,955 | Smith | Mar. 10, 1925 |
| 1,900,756 | Butts | Mar. 7, 1933 |
| 1,997,220 | Killgore | Apr. 9, 1935 |
| 2,097,909 | Atz, Jr. | Nov. 2, 1937 |
| 2,273,583 | Meister | Feb. 17, 1942 |
| 2,467,113 | Deiters | Apr. 12, 1949 |
| 2,472,058 | Artley | June 7, 1949 |
| 2,551,263 | Gribble | May 1, 1951 |
| 2,588,942 | Still | Mar. 11, 1952 |
| 2,633,256 | McGhee | Mar. 31, 1953 |